United States Patent [19]

Johnson

[11] Patent Number: 5,701,047
[45] Date of Patent: Dec. 23, 1997

[54] ELECTRIC FAN MOTOR

[75] Inventor: Hugh Griffith Johnson, Auckland, New Zealand

[73] Assignee: Fisher & Paykel Limited, Auckland, New Zealand

[21] Appl. No.: 387,882

[22] PCT Filed: May 3, 1995

[86] PCT No.: PCT/NZ93/00072

§ 371 Date: Apr. 20, 1995

§ 102(e) Date: Apr. 20, 1995

[87] PCT Pub. No.: WO94/05073

PCT Pub. Date: Mar. 3, 1994

[30] Foreign Application Priority Data

Aug. 21, 1992 [NZ] New Zealand ............... 244046

[51] Int. Cl.$^6$ ............... H02K 1/12; H02K 1/00; H02K 15/00; H01F 3/04

[52] U.S. Cl. ............... 310/254; 310/216; 310/259; 29/596; 29/609

[58] Field of Search ............... 310/216, 217, 310/42, 254, 258, 90, 259, 162; 29/596, 598, 609

[56] References Cited

U.S. PATENT DOCUMENTS

| | | | |
|---|---|---|---|
| 2,752,517 | 6/1956 | Von Deldon | 310/217 |
| 3,866,014 | 2/1975 | Waller | 219/137 |
| 3,983,621 | 10/1976 | Donahoo | 29/596 |
| 4,080,725 | 3/1978 | Cronk | 29/609 |
| 4,471,253 | 9/1984 | Laing | 310/217 |
| 4,613,842 | 9/1986 | Ichiyama et al. | 336/218 |
| 4,707,910 | 11/1987 | Saeed | 29/596 |
| 5,047,745 | 9/1991 | Marriott et al. | 310/217 |
| 5,153,475 | 10/1992 | McSparran | 310/254 |
| 5,339,514 | 8/1994 | Whitesel | 29/596 |

*Primary Examiner*—Steven L. Stephan
*Assistant Examiner*—Michael John Wallace, Jr.
*Attorney, Agent, or Firm*—Trexler, Bushnell, Giangiorgi & Blackstone, Ltd.

[57] ABSTRACT

An electric motor is suitable for use in, for example, a home appliance, such as a refrigerator/freezer, to drive a fan blade. The electric motor includes a permanent magnet rotor and an excited two part laminated stator. The two parts of the stator are adapted to be connected together about the rotor with the axis of the rotor in the plane of the laminations. The rotor has two axially separated pole regions and the stator is configured to provide a separate rotor receiving pole pair for each rotor pole region. Each stator pole pair provides a rotor receiving space within which respective rotor pole regions are disposed, wherein the stator is made up of separate laminations of ferromagnetic material and adjacent laminations are displaced relative to each other in the plane of the laminations in directions perpendicular to the rotor axis such that the stator poles are each formed by a pair of semi-circular shaped poles to provide the rotor receiving spaces. The stator is constructed from a single piece, with a central portion of the piece being removed and the remaining unitary portion being juxtaposed to form a magnetic circuit having two circular rotor receiving spaces adapted to receive the rotor. A method of constructing the stator for the electric motor from a single piece of laminated magnetically permeable material is also disclosed.

6 Claims, 6 Drawing Sheets

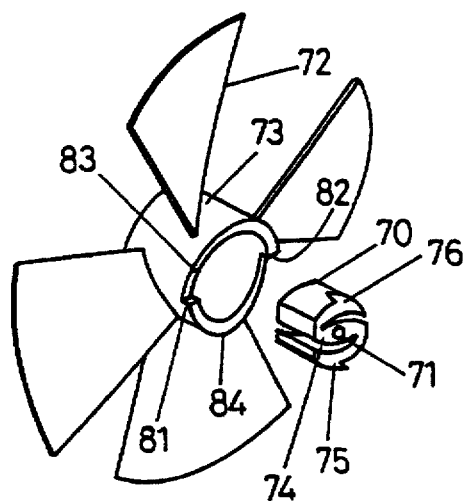
FIG 12
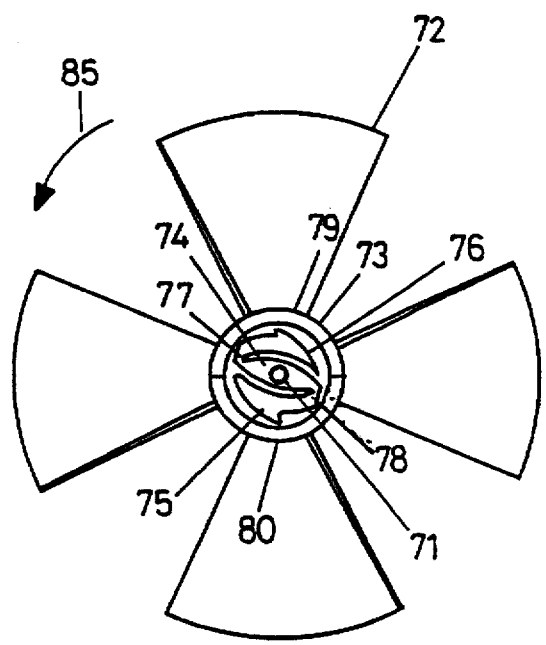
FIG 13
FIG 14
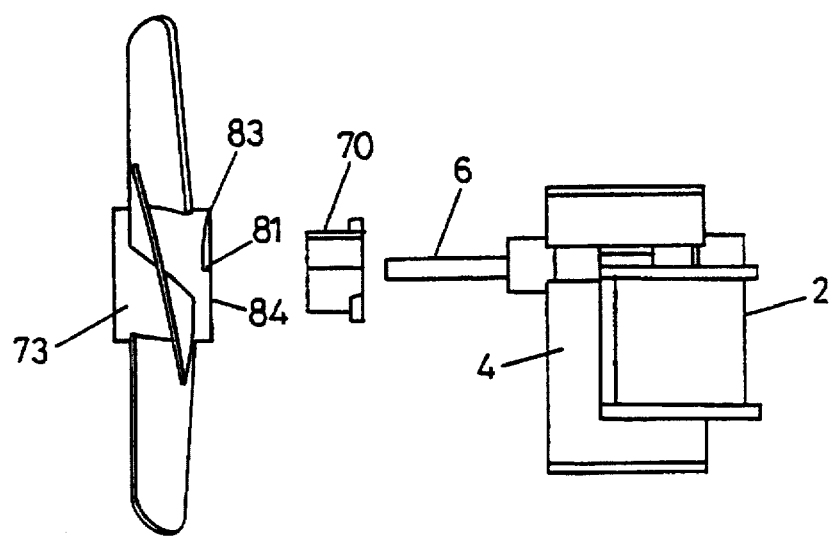

ELECTRIC FAN MOTOR

TECHNICAL FIELD

This invention relates to electric motors and has been devised particularly though not solely for use in home appliances.

BACKGROUND ART

Some existing single phase AC electric motors which are utilised in home appliances, for example, refrigerator/freezers for driving fans are very inefficient electrically. Also, because these motors are necessarily small, many require the propeller or blade to have a correspondingly small moment of inertia and thus a small diameter in order that the propeller may be rotated from a standstill. This requirement is in direct contrast to the need for lower noise levels that can be achieved by large diameter fans moving air at a relatively low speed.

In existing single phase permanent magnet synchronous motors running from a fixed frequency supply, various methods of starting are used that include rotor cages and mechanical resonance. These start up arrangements are then disengaged upon the rotor nearing synchronous speed. An example of a motor which utilises mechanical resonance at start up is disclosed in U.S. Pat. No. 4,861,240 (Marioni and Cavalcante). This motor, however, has the disadvantages that it produces excessive noise and its direction of rotation upon starting is random.

In some motors, the required acceleration to synchronous speed is too great, increasing wear on the motor and moving pans and thus an efficient and reliable clutch is required. In addition, when the magnetic circuit is of the substantially "horseshoe" shape, wasteful use has previously been made of the stator material.

DISCLOSURE OF THE INVENTION

It is an object of the invention to provide an electric motor which will overcome the above disadvantages or which will at least provide the public with a useful choice.

Accordingly in one aspect the invention consists in an electric motor comprising:

a permanent magnet rotor and an excited stator, said stator configured such that a substantial part of the stator flux path is parallel to the rotor axis and said rotor is positioned to electromagnetically intersect said flux path.

In a further aspect the invention consists in an electric motor comprising:

a ferromagnetic or magnetically responsive stator core having a plurality of limbs, at least one winding on at least one said limb, a rotor receiving space in each of two of said limbs, said rotor receiving spaces being arranged in longitudinal alignment with each other, a permanent magnet rotor rotatably mounted in said stator with at least one permanent magnet positioned and oriented in said at least one rotor receiving space, said stator being configured and the permanent magnets in said rotor being positioned and oriented in said rotor receiving spaces in said stator so that the rotor axis is parallel to magnetic flux in two limbs of said stator so that lines of flux normal to the rotor axis act on said permanent magnets to cause rotation thereof.

In a further aspect the invention consists in an electric motor comprising a permanent magnet rotor and an excited stator, said rotor having two axially separated pole regions and said stator being configured to provide two rotor receiving pole pairs, each pair providing a rotor receiving space within which respective rotor pole regions are disposed.

In a still further aspect the invention consists in a stator for an electric motor constructed from a single piece of magnetically permeable material, a central portion of said piece having been removed and said central portion and the remaining unitary portion of said piece being juxtaposed to form a magnetic circuit having two rotor receiving spaces.

In a still further aspect the invention consists in a method of constructing a stator for an electric motor from a single piece of magnetically permeable material comprising the steps of:

i) removing a central portion from said piece, said central portion having ends and central sides between said ends, one of said ends of said central portion comprising part of the first side of said piece; and ii) placing the central portion of said piece across the remaining portions of said first side with a central side disposed adjacent the remaining portions of said first side with rotor receiving spaces therebetween.

In a still further aspect the invention consists in a clutch mechanism driven by an electric motor for connection of a load to a shaft of said motor comprising:

shaft engaging means, for connecting said clutch mechanism to said shaft, load engaging means attached to said shaft engaging means and adapted for connection to said load, said load engaging means being such that the amount of torque transmitted to the load is greater than the motor torque in an undesired direction and less than the motor torque in a desired direction so that should the motor start in said undesired direction, the motor is stalled by the inertia of said load during acceleration and will not continue to run in the desired direction unless the motor starts to run in that direction and said load is then driven continuously in the desired direction.

In a still further aspect the invention consists in an electric fan comprising:

a permanent magnet rotor motor, a clutch means, fixedly attached to said rotor, a fan impeller, frictionally engaging said clutch means, a plurality of fan impeller engaging means, pivotally connected to said clutch means at points symmetrically displaced from the axis of said rotor which, upon rotation of said rotor in a first direction, pivot such that the torque transfer engagement to said fan impeller is increased while rotation of said shaft in the opposite direction to said first direction produces a reduced torque transfer engagement with said fan impeller.

In a still further aspect the invention consists in a clutch mechanism for an electric fan, said fan having a permanent magnet rotor shaft and a fan impeller for rotation by said shaft, said clutch mechanism frictionally engaging said fan impeller to said shaft and comprising:

shaft engaging means, for fixedly engaging said clutch mechanism to said shaft, a plurality of fan impeller engaging means, pivotally connected to said shaft engaging means, symmetrically displaced from the axis of said shaft, such that upon rotation of said shaft in a first direction, said shaft engaging means increases said torque transfer engagement to said fan impeller while rotation of said shaft in the opposite direction reduces said torque transfer engagement.

BRIEF DESCRIPTION OF THE DRAWINGS

This invention consists in the foregoing and also envisages constructions of which the following gives examples.

Preferred forms of the present invention will now be described with reference to the accompanying drawings in which:

FIG. 12 is an exploded perspective view of a fan blade and associated clutch mechanism for the electric motor of FIG. 1;

FIG. 13 is a back view, from the motor, of the fan blade of FIG. 12 with the clutch mechanism in place and in its disengaged state; and FIG. 14 is a partly exploded side view of the fan blade and clutch mechanism of FIG. 12 aligned with the rotor shaft of the electric motor of FIG. 1.

MODES(S) FOR CARRYING OUT THE INVENTION

Figure 1:
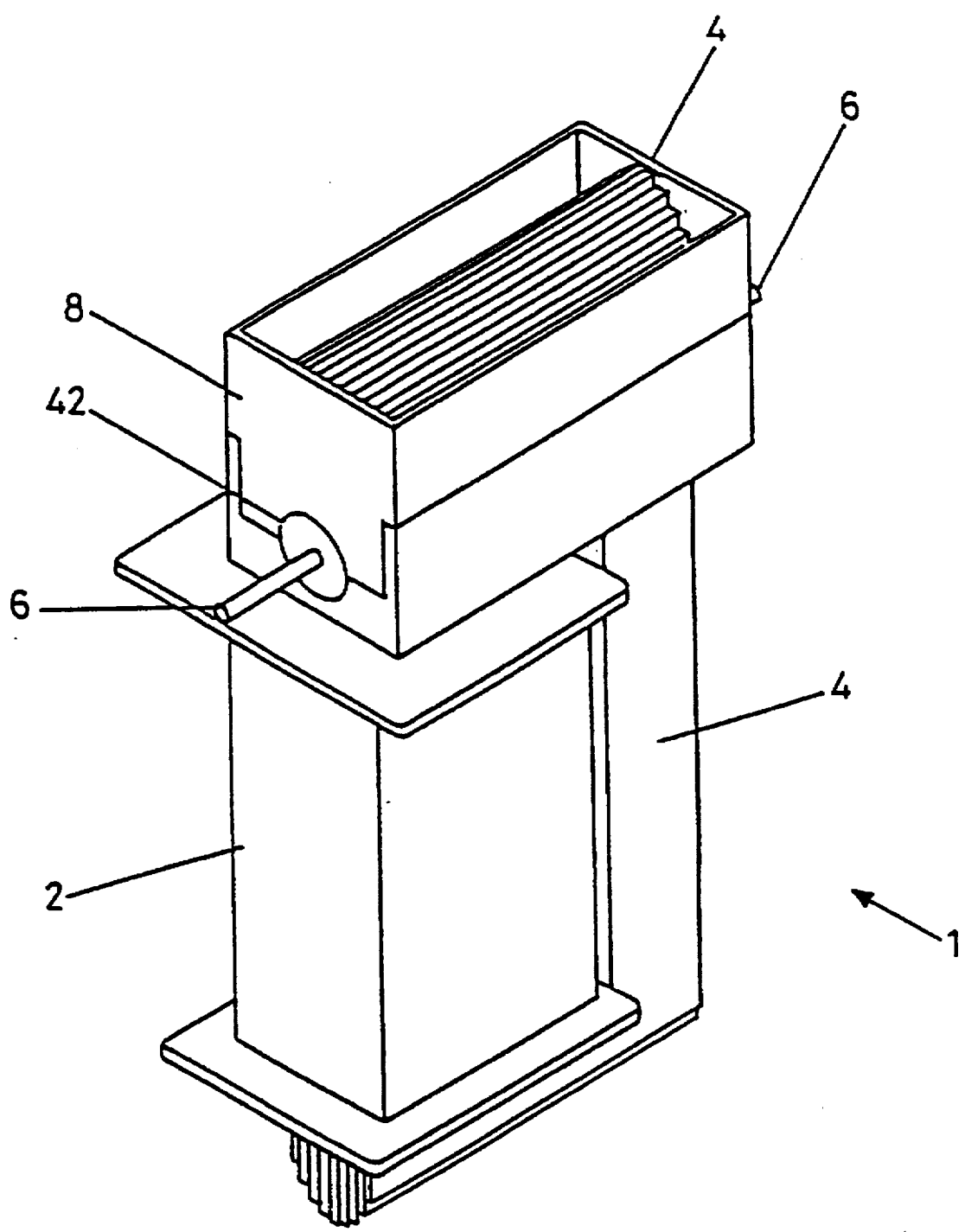
FIG. 1 is a perspective view of an electric motor in accordance with the present invention.

Referring to FIG. 1, an electric motor according to the invention and generally referenced 1 is shown having a stator including an energising coil 2 about a magnetic core comprising a magnetic circuit 4 constructed from a magnetically responsive material e.g. a laminated magnetically responsive material such as soft iron or ferromagnetically active material such as a plastics material containing iron. The motor also has a rotor (not shown in FIG. 1) having a rotor shaft 6 carried in suitable bearings such as bearings 42. The magnetic circuit has an upper portion 8 containing a magnetically responsive material 14 being a pan of the magnetic circuit 4.

Figure 3:
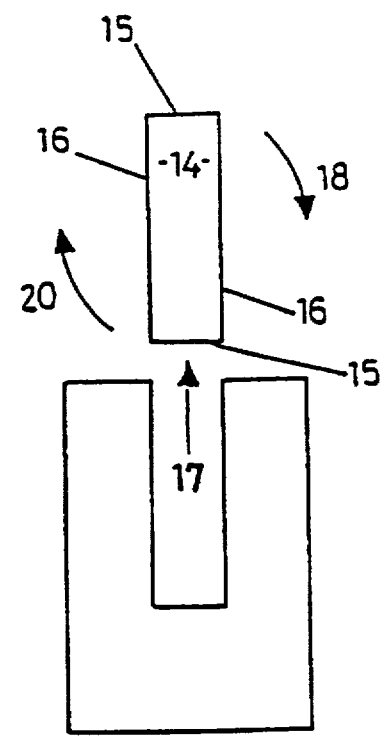
Figure 4:
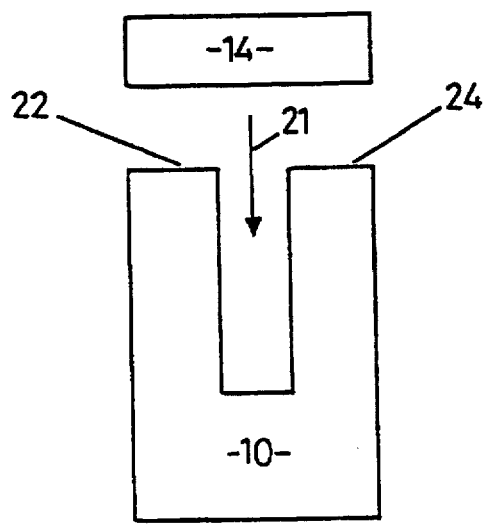

The magnetic circuit 4 is constructed as described below with reference to FIGS. 2 to 4.

Figure 2:
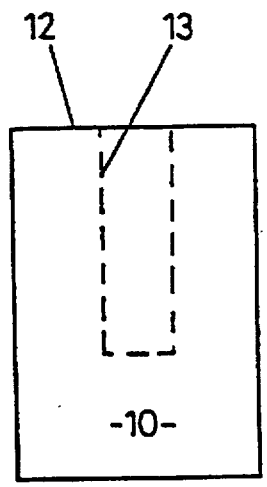
FIGS. 2, 3 and 4 are diagrammatic elevations of a magnetic circuit for the electric motor shown in FIG. 1.
Figure 5:
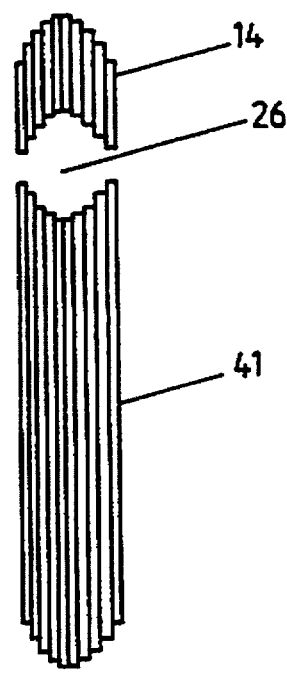
FIG. 5 is an end elevation in cross section of the stator magnetic circuit of FIG. 4.

Referring to FIG. 2 a lamination of a magnetically responsive (for example ferromagnetic) material 10 is shown having a first side 12. To form a stator magnetic circuit a central portion of the magnetic circuit defined by dashed line 13 is removed from piece 10. Referring to FIG. 3, after for example cutting piece 10 about lines 13, the central portion 14 so formed is removed from piece 12 as indicated by arrow 16. The central portion 14 has ends 15 and central sides 16 and is rotated as shown by arrows 18 and 20 and one of the central sides 16 is placed on top of the remaining end portions 22 and 24 of side 12 of piece 10 (arrow 21, FIG. 4). Other arrangements are possible but the above described arrangements make economical use of the lamination material. A stack of laminations 10 are provided and a substantially cylindrical aperture 26 (FIG. 5) is provided between the central portion 14 of the magnetic circuit and the remainder 41 of the magnetic circuit by arranging laminations as shown in the end elevation and cross section of FIG. 5. Such arrangement is effected by displacing adjacent laminations so that the free comers thereof lie on a circle as may be seen in FIG. 5. Thus, two circular or cylindrical rotor receiving spaces are created, each between a pair of juxtaposed semi-circular shaped poles comprising the ends of core limbs 60 and 61 (see FIG. 7) and the regions of the central portion 14 which face the ends of the core limbs 60 and 61.

Thus at least in this preferred form it is not necessary to produce different sized laminations since a cylindrical rotor receiving aperture 26 is provided simply by displacing the laminations relative to each other during assembly to give the required hollow cylindrical configuration. Fixing of the laminations may be effected by encasing the laminations in a plastic casing or by using a suitable adhesive, for example LOCTITE 601. A rotor 27 of the electric motor constructed in accordance with the present invention is disposed in rotor receiving space 26. The construction of the stator magnetic circuit in accordance with the present invention substantially eliminates wastage of the material from which it is constructed.

Figure 6:
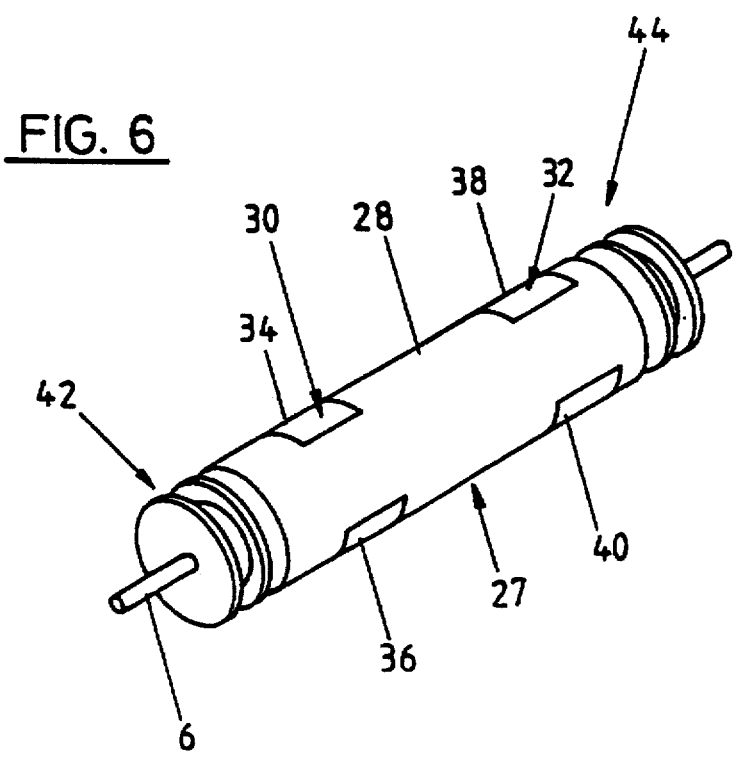
FIG. 6 is a perspective view of a rotor for the electric motor stator constructed in accordance with FIGS. 1 to 5.

Referring to FIG. 6, the rotor 27 for the electric motor of the present invention has a rotor shaft 6 carrying a central rotor portion 28 having permanent magnets 30 and 32 passing transversely through the rotor. The central rotor portion 28 is constructed from, for example, a plastic material moulded or machined to the correct shape having spaces therein or holes through the central portion of the rotor to accommodate magnets 30 and 32. In FIG. 6 the magnets 30 and 32 are shown arranged in a substantially vertical disposition such that the upper and lower ends 34 and 36 of magnet 30 are polarised in the opposite direction to the upper and lower ends 38 and 40 of magnet 32. For example, if end 34 of magnet 30 has a north polarity and end 36 has a south polarity then end 32 of magnet 38 will have a south polarity and end 40 of magnet 32 will have a north polarity. Bearings 42 and 44 are also provided for location in, for example, plastic surrounds of the magnetic circuit.

Figure 7:
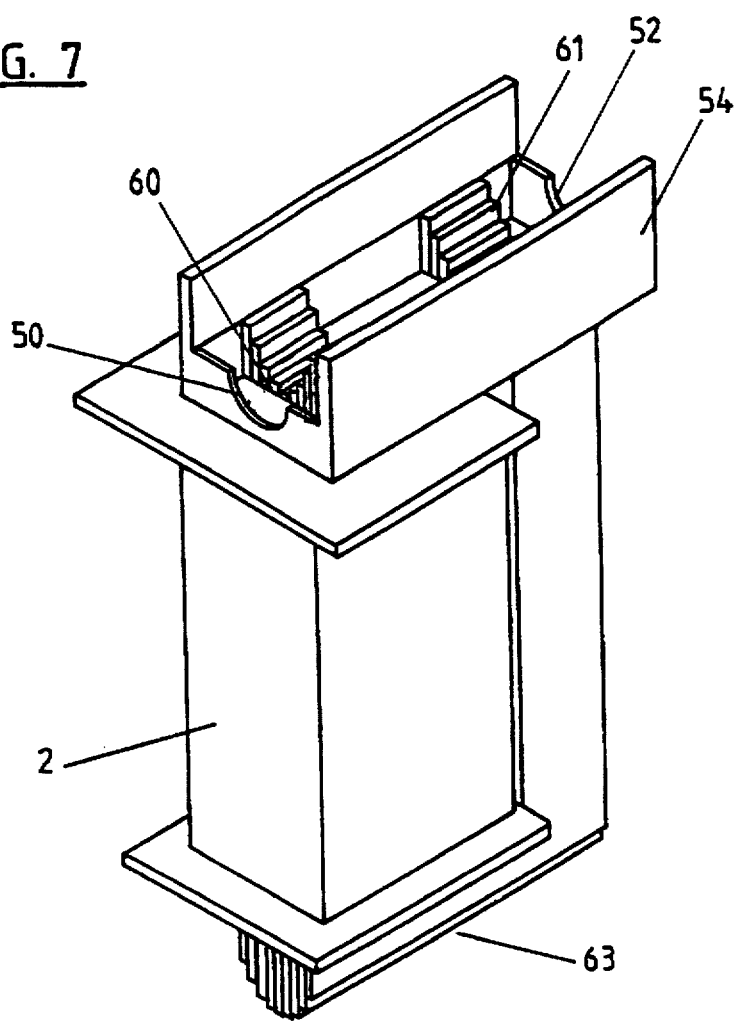
FIG. 7 is a perspective view of the magnetic circuit energising coil and pan of the stator magnetic circuit of the electric motor of FIGS. 2 to 5.
Figure 8:
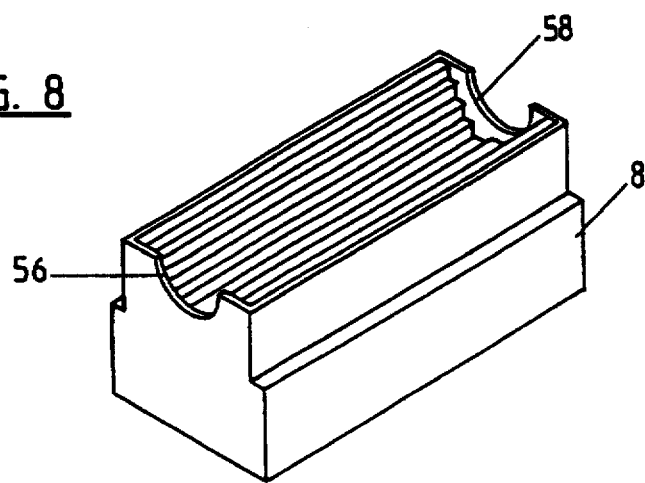
FIG. 8 is an inverted perspective view of the upper pan of the magnetic circuit of FIGS. 2 to 5.

Referring to FIGS. 7 and 8 the magnetic circuit previously described with reference to FIGS. 2 to 5 is shown having a coil placed about one leg thereof, energisation of the coil providing a magnetic flux in the magnetic circuit 4. The electric motor of FIG. 1 is formed by placing the bearings 42 and 44 of the rotor of FIG. 6 in the cradle formed by edges 50 and 52 of the upper portion 54 of the magnetic circuit. The upper portion 54 is, for example, moulded from a plastics material. The corresponding edges 56 and 58 of the upper portion 8 are placed over the bearings 42 and 44 to complete the motor construction. A suitable clamping means (not shown) is provided to hold the various parts together.

In use, the energising coil 2 is connected to a source of alternating current, for example, a single phase, 230 V source. The frequency of the supply current may be constant, or may be varied by, for example, electronic control means to control motor speed and/or torque. Such a source when provided at a frequency of 50 Hz should produce a synchronous rotor speed of 3000 rpm. If the motor of the present invention is used to supply energy to a load, for example, to rotate a fan propeller, then some form of clutch will be required at start up to allow the motor to reach working speed. An example of such a clutch will soon be described with reference to FIGS. 12 to 14.

The alternating current in the energising coil induces an alternating magnetic flux in the magnetic circuit. As may be seen from FIGS. 6 to 8, magnetic flux passes from core limb 60 across the part of the rotor containing permanent magnet 30 along central portion 14 of the stator, across the part of the rotor containing permanent magnet 32 into limb 61 to limb 63 and thence back to limb 60. Since the direction of magnetic flux in one leg of the circuit is opposite to the flux direction in the other leg at any point in time, the direction of polarity of the magnet 30 must be opposite to that of magnet 32 for rotation, as previously described. Since a rotating magnetic field is not present in the stator to induce rotation of the rotor, to start rotation the rotor 28 is designed to mechanically resonate at a frequency corresponding to the frequency of the A.C. source applied to the energising coil 2. Thus at start up, when current is supplied to coil 2, the rotor begins to rotate back and forth slightly, the movement rapidly increasing until a half rotation (180°) in one direction occurs. This then converts to continuous rotation in one direction at synchronous speed.

Figure 9:
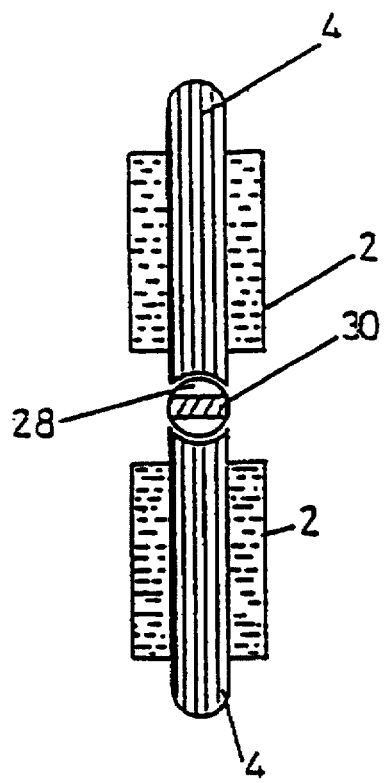
FIGS. 9 and 10 are end elevations in cross section of a two pole set and a three pole set electric motor respectively, constructed in accordance with the present invention.
Figure 10:
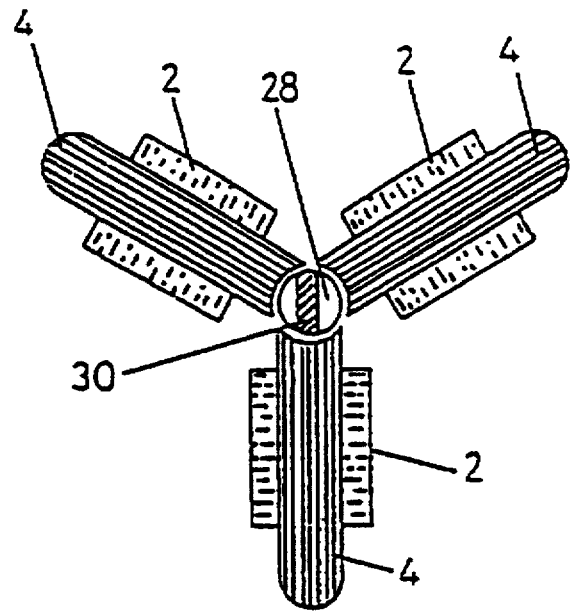
Figure 11:
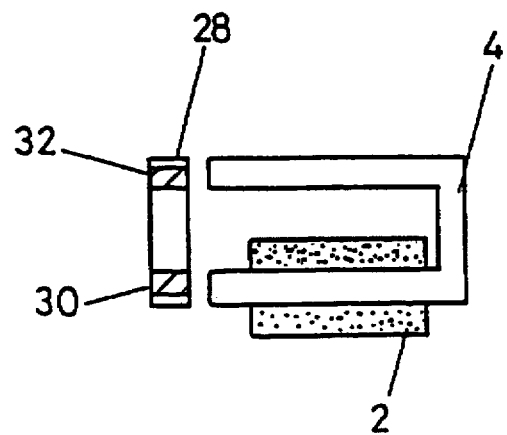
FIG. 11 is a side elevation in cross section of a part of the magnetic core for each of the pole pairs of the motors of FIGS. 9 and 10.

FIGS. 9 and 10 show a similar motor construction to that described above, but using 2 pole sets and 3 pole sets respectively in the magnetic circuit. FIG. 11 is a side elevation in cross section of the construction of the magnetic core and energising coil for each pole set of the motors of FIGS. 9 and 10. The reference numerals for FIGS. 9 to 11 correspond to the reference numerals used above with reference to the components of the single pole motor. The operation of the motors of FIGS. 9 and 10 is similar to that described above.

With reference now to FIGS. 12 to 14, a clutch mechanism for allowing direct on-line starting of the motor of the present invention is shown. It can be seen in FIG. 14 that a centrifugal type clutch 70 is adapted for co-axial fitting over the rotor shaft 6. The centrifugal type clutch is preferably manufactured from a soft rubber or plastics material and is provided with a hole 71 which is preferably a tight fit on rotor shaft 6 so that the centrifugal type clutch 70 firmly engages the rotor shaft 6. A fan impeller 72 is provided with a hollow cylindrical clutch housing or rim 73 which has an inner diameter smaller than the largest external diameter of clutch 70. The internal surface of the housing 73 is smooth and the impeller 72 is preferably made from a hard plastics material and is provided with, for example, four individual blades.

With particular reference to FIGS. 12 and 13 it can be seen that the centrifugal type clutch 70 comprises a central elongated substantially diamond shaped region 74 connected to leading 75 and trailing 76 friction shoes, connected to opposite ends of the central diamond shaped section 74 by thin webs or connecting members 77 and 78 respectively. Each of the shoes 75 and 76 are provided with a fin or tooth 9 and 80 respectively and housing 73 is provided with corresponding engaging surfaces 81 and 82. The external circumferential surface of clutch housing 73 which is closest to the electric motor is moulded in the shape of two half circular helical surfaces 83 and 84. Surface 83, originates at the base of engaging surface 81, and rises helically to the top of engaging surface 82 while surface 84 originates at the base of surface 82 and rises helically to the top of surface 81.

In use, the clutch mechanism of the present invention ensures that the fan blade will always rotate in a counter clockwise direction when viewed from the electric motor (in the direction of arrow 85 in FIG. 13). If the rotor 6 of the motor were to start rotating, from rest, in a clockwise direction (opposite to arrow 85), the lower and upper shoes 75 and 76 would experience an outward tangential force causing webs or connecting members 77 and 78 to flex, allowing the shoes 75 and 76 to move outwards away from the central region 74. The teeth 79 and 80 would then frictionally engage the inner surface of clutch housing 73 transferring torque thereto. As the rotor 6 of the motor is initially not connected to blade 72, it begins to accelerate rapidly and because of the self-locking tendency of the shoes 75 and 76, a very high friction torque is developed between the rotor shaft 6 and blade 72 which causes the rotor to stall. At this point in time the motor will attempt to restart. If the direction of rotation is still clockwise, the motor will again stall. If, however, the direction of rotation of shaft 6 is counter clockwise (in the direction of arrow 85) then shoes 75 and 76 will again experience an outward tangential force, causing them to move toward the clutch housing 73. As the shoes have no self-locking tendency in this direction, the frictional torque is less than the torque required to stall the motor and impeller 72 slowly accelerates.

As the impeller 72 accelerates it will experience an increasing force due to the pressure of the air being moved by the impeller and this force will act in a direction parallel to the axis of the rotor, causing impeller 72 to move towards the motor while rotating at a reduced speed relative to the combined rotor shaft 6 and clutch 70. The impeller will eventually reach the point where teeth 79 and 80 engage surfaces 81 and 82 respectively of the clutch housing. At this point, the speed of the rotor will be close to synchronous speed and the rotor and clutch mechanism 70 will have built up considerable inertia. The engagement of impeller 72 via the teeth on surfaces 81 and 82 of the clutch housing 73 will, therefore, cause the impeller 72, clutch mechanism 70 and rotor shaft 6 to rotate at the same (synchronous) speed.

Upon power being disconnected from the motor, the rotor shaft 6 will decelerate along with fan blade 72 reducing the magnitude of the force due to resistance of the air on the blade surfaces. The blade will then move away from the electric motor, disengaging the teeth 79 and 80 and a stopper at the end of rotor 6 (not shown) is provided such that the blade will still be retained by the shaft. The impeller, clutch and motor will then, once again, be in their initial, resting states.

Other forms of starting such as the known use of unidirectional spring clutches may be provided.

The advantages of the small diameter rotor provided by the above described motor construction are that the rotor has low inertia and low windage. Low windage reduces losses and thus results in greater efficiency and low inertia assists start up of the motor and enables the motor to reach operating speed in less time.

Furthermore because the magnetic flux induced in the stator is intersected in two places by the parts of the rotor which contain the permanent magnets, it is believed that additional efficiency will result.

The advantages of the clutch mechanism of the present invention are that it provides an assurance that the fan will rotate in one, selected direction only. Also, relatively slow acceleration is produced as the friction shoes 75 and 76 allow slip giving speeds of up to about 70% of motor speed before final engagement. This prevents excessive stresses on the individual moving parts of the motor and clutch arrangements. In addition, once the motor has reached synchronous speed, there is a positive lock between the rotor shaft, clutch mechanism and the blade.

I claim:

1. An electric motor comprising a permanent magnet rotor having an axis of rotation and an excited two part laminated stator made up of separate laminations of ferromagnetic material, the two parts of said stator adapted to be connected together about said rotor with said axis of said rotor in the plane of said laminations, said rotor having two axially separated pole regions and said stator being configured to provide a separate rotor receiving pole pair for each said rotor pole region, each stator pole pair providing a rotor receiving space within which respective rotor pole regions are disposed, wherein entire adjacent laminations in said stator are displaced relative to each other in the plane of the laminations in directions perpendicular to said rotor axis such that said stator poles are each formed by a pair of semi-circular shaped poles to provide said rotor receiving spaces.

2. An electric motor comprising a permanent magnet rotor having an axis of rotation and an excited two part laminated stator made up of separate laminations of ferromagnetic material, the two parts of said stator adapted to be connected together about said rotor with said axis of said rotor in the plane of said laminations, said rotor having two axially separated pole regions and said stator being configured to provide a separate rotor receiving pole pair for each said rotor pole region, each stator pole pair providing a rotor receiving space within which respective rotor pole regions are disposed, wherein adjacent laminations in said stator are displaced relative to each other in the plane of the laminations in directions perpendicular to said rotor axis such that said stator poles are each formed by a pair of semi-circular shaped poles to provide said rotor receiving spaces, said stator further comprises a substantially "U" shaped portion with a substantially "T" shaped portion disposed across the open ends of the said "U" shaped portion with said rotor receiving spaces provided between the "T" shaped portion and the open ends of the "U" shaped portion.

3. A two part laminated stator for an electric motor constructed from a single piece of magnetically permeable material, a central portion of said piece having been removed and said central portion and the remaining unitary portion of said piece being juxtaposed to form a magnetic circuit having two circular rotor receiving spaces adapted to receive a rotor having two axially separated pole regions and an axis of rotation, the two parts of said stator adapted to be connected together about said rotor with said axis of said rotor in the plane of the laminations, wherein adjacent laminations are displaced relative to one another in the plane of the laminations in directions perpendicular to the rotor axis in order to produce said two circular rotor receiving spaces.

4. A stator as claimed in claim 3 wherein said piece is rectangular in shape and a central "T" shaped portion is removed to leave a "U" shaped portion and the two portions are juxtaposed so that the "T" shaped portion lies across the open ends of the "U" shaped portion with said rotor receiving spaces being longitudinally aligned between the "T" shaped portion and the ends of the "U" shaped portion.

5. A method of constructing a stator for an electric motor from a single piece of laminated magnetically permeable material having a first side comprising the steps of:

i) removing a central portion from said piece, said central portion having ends and central sides between said ends, one of said ends of said central portion comprising part of the first side of said piece;

ii) placing the central portion of said piece across the remaining portions of said first side with a central side disposed adjacent the remaining portions of said first side with two rotor receiving spaces therebetween, and iii) displacing adjacent laminations relative to each other in order to produce cylindrical rotor receiving spaces adapted to receive a rotor having an axis of rotation, said adjacent laminations being displaced relative to each other in the plane of the laminations in directions perpendicular to the rotor axis.

6. A method as claimed in claim 5 further including the step of forming a rotor having two axially aligned pole regions and inserting said rotor into said stator such that one said rotor pole region is positioned within each said rotor receiving space.

* * * * *